ADJUSTABLE MOUNTING ARRANGEMENT FOR MAGNETIC HEAD

Filed March 15, 1967

Inventor
Fred J. Zenz
By Brown, Jackson, Boettcher & Dienner
Attys 3,502,820

ADJUSTABLE MOUNTING ARRANGEMENT FOR MAGNETIC HEAD

Fred J. Zenz, Berrien Springs, Mich., assignor to V-M Corporation, Benton Harbor, Mich., a corporation of Michigan Filed Mar. 15, 1967, Ser. No. 623,410
Int. Cl. G11b 5/48
U.S. Cl. 179—100.2 11 Claims

ABSTRACT OF THE DISCLOSURE

A mounting arrangement for a transducer head and the like which provides for vertical adjustment and azimuth alignment of the face of the transducer head relative to a tape disposed in sliding contacting relationship with the face of the transducer head.

BACKGROUND OF THE INVENTION

In the field of recording, and in particular the field of sound recording utilizing magnetic tapes, it is a conventional practice to support transducer heads utilized for recording, playback and erase such that the tape engaging faces of the respective heads are disposed in substantially parallel relation to the plane of the magnetic tape. It is desirable that the vertical axes of the respective heads be disposed parallel to the tape and in planes normal to the longitudinal axis of the tape, such relationship being known as the azimuth alignment of the transducer heads relative to the tape. Such head-to-tape relationship is essential to insure proper engagement between the tape and the heads and further to insure consistent positioning of the heads relative to recorded tracks on the tapes.

Attempts have been made to provide mounting brackets for transducer heads used in conjunction with magnetic tapes which allow the transducer head to be adjusted relative to the tape. Such prior art devices, however, fail to provide suitable transducer head mounting arrangements either in that they lack the accuracy desirable in a tape-to-transducer head relationship or require a plurality of adjustments through adjusting screws, thereby requiring a lengthy period for making the needed adjustments. For example, where three or more adjusting screws, or their equivalent, are used in the prior art devices, adjustment of any one screw produces a skewing action which requires adjustment of one or more other screws. Consequently, the prior art devices do not lend themselves to rapid efficient assembly line techniques, thereby substantially increasing the manufacturing costs associated therewith.

SUMMARY OF THE INVENTION

Accordingly, it is one of the primary objects of the present invention to provide an adjustable mounting arrangement for a transducer head and the like which greatly simplifies transducer head adjustment over the prior art devices and thereby lends itself to more rapid adjustment during assembly and reduces manufacturing costs.

Another object of the present invention is to provide an adjustable mounting arrangement for a transducer head and the like which maintains the face of the transducer head in a plane parallel to the plane of tape travel and which also provides ready, accurate adjustment of the azimuth alignment of the tape contacting face of the transducer head.

Another object of the present invention is to provide a transducer head adjustable mounting arrangement as described which includes means for adjusting the transducer head upwardly or downwardly relative to the longitudinal axis of the magnetic tape and further includes novel means for adjusting the azimuth alignment of the tape contacting face without substantially affecting the said upward or downward position of the head.

A further object of the present invention is to provide an adjustable support arrangement as described wherein only two supporting studs are needed to secure the transducer head to a mounting bracket, with the axes of the studs being disposed in a plane parallel to the plane of the face of the head at the point of tape contact, and which studs allow for adjustment of the transducer head crosswise the longitudinal axis of the tape and azimuth positioning of the head relative to the tape.

Still another object of the present invention is to provide an adjustable transducer head mounting arrangement as described which includes a novel leaf spring positioning means to maintain the tape contacting face of the transducer head in a plane parallel to the plane of tape travel during azimuth positioning of the face of the transducer head relative to the tape.

In a preferred embodiment of a transducer head adjustable mounting arrangement in accordance with the present invention, a conventional transducer head is provided with a plate on the upper surface thereof. Two threaded studs are secured in upstanding relation to the upper surface of the plate, with the axis of the first of the studs lying in the plane of the air gap of the pole pieces of the transducer head, which plane is normal to the tape, with the second stud being offset from the first stud such that the axes of the studs lie in a plane parallel to the plane of tape travel as it engages the face of the transducer head. The two mounting studs extend upwardly through apertures in a supporting structure, such as a mounting bracket, and are retained therein by threaded nuts. A curved leaf spring receives the first stud through an aperture in the center thereof and is disposed between the upper surface of the transducer head plate and the lower surface of the overhead mounting bracket. The leaf spring is dimensionally controlled such that the top and bottom engagement portions thereof are line contacts parallel to each other and to a surface of the mounting bracket, with the face of the transducer head lying in a plane normal to the planes of the plate and of the mounting bracket and parallel to the plane of the tape. The parallel lines of the line contacts extend in a direction normal to the plane of the tape. A helical coil spring is disposed about the offset stud between the transducer head plate and the support bracket so as to urge the threaded nut on the outer end of the offset stud against the upper surface of the support bracket. Rotational movement of the nut of the center stud serves to adjust the transducer head upwardly and downwardly with respect to the mounting bracket, and thus with respect to the magnetic tape, while rotational movement of the nut on the offset stud serves to adjust the transducer head with respect to azimuth alignment with the magnetic tape. Thus, the novel dimensionally controlled curved leaf spring assists in maintaining the plane of the face of the transducer head in a plane perpendicular to the support bracket and parallel to the plane of tape travel, while upward and downward adjustment of the transducer head relative to the tape and azimuth alignment of the head relative to the tape may be readily accomplished through selective adjustment of the nuts on the outer ends of the mounting studs.

Further objects and advantages of my invention, together with the organization and manner of operation thereof, may best be understood by reference to the following description of a preferred embodiment of the invention taken in conjunction with the accompanying drawing in the several figures of which like reference numerals identify like elements.

DESCRIPTION OF A PREFERRED EMBODIMENT

Figures 1, 3:
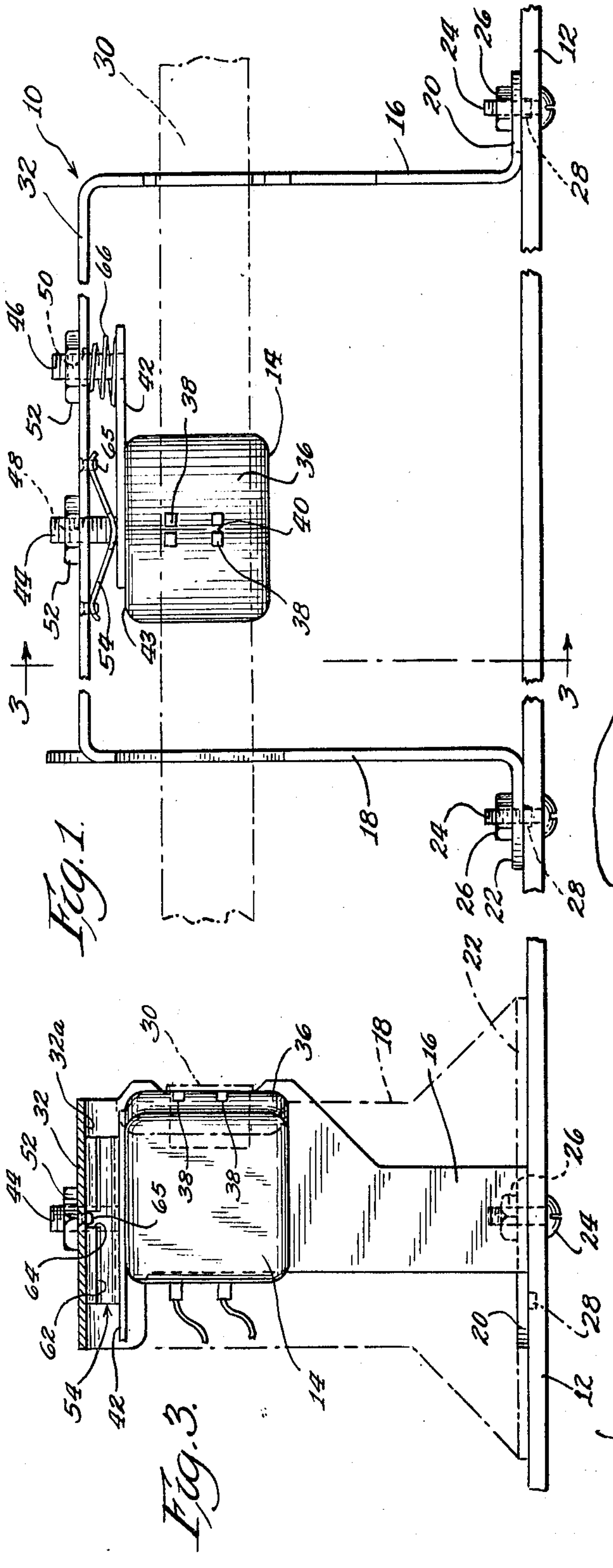
FIGURE 1 is a front elevational view of a preferred embodiment of a transducer head mounting arrangement in accordance with the present invention.
FIGURE 3 is a vertical sectional view taken substantially along the line 3—3 of FIGURE 1, with the removed end portion being illustrated in phantom lines.

Referring now to the drawing, and in particular to FIGURE 1, a supporting structure in the form of a mounting bracket, designated generally by reference numeral 10, is secured in generally upstanding relation to a base member 12 and serves as the main support means for a conventional transducer head 14. The bracket may of course support a plurality of transducer heads but only one is needed to illustrate my invention. The mounting bracket 10 is of a generally inverted U-shape having leg portions 16 and 18 which terminate in flange portions 20 and 22, respectively. The flange portions 20 and 22 may be suitably secured to the base member 12 as by screws 24 and nuts 26 and preferably each flange portion includes a depression 28 (FIGURE 2) adapted to be received within a corresponding depression in the base member 12 for locating the mounting bracket in proper relation on the base member and in proper relation to the magnetic tape which passes.

The base member 12 may comprise the basic support chassis plate in a magnetic tape recorder adapted to rotatably support conventional tape reels (not shown) between which a magnetic tape, indicated in phantom lines by reference numeral 30, may be transported in a conventional manner. It will be understood that the tape support reels are conventionally supported relative to the base member 12 such that the magnetic tape 30 lies in a plane substantially normal to the base member during sliding contact of the tape with the contact face of the transducer head 14 as will be described below.

The mounting bracket 10 includes an upper horizontal planar portion 32 which lies in a plane parallel to the plane of the base member 12 and thus normal to the plane of the magnetic tape 30 during movement thereof past the transducer head 14.

Figure 2:
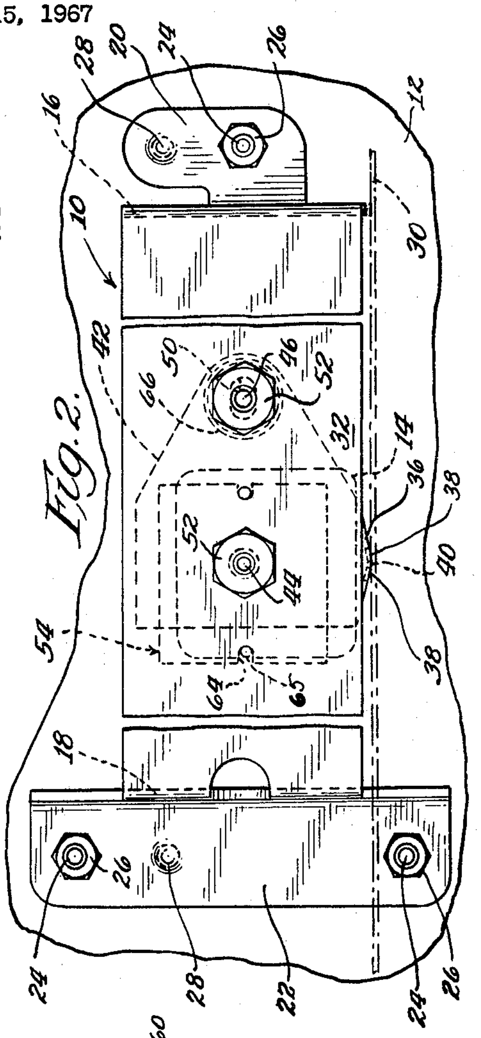
FIGURE 2 is a top plan view of the mounting arrangement illustrated in FIGURE 1, with certain hidden elements being shown in broken lines.

Referring to FIGURES 1 and 2, the transducer head 14 is of conventional design and includes a front V-shaped portion 36, as viewed in FIGURE 2. The face 36 includes a pair of conventional sets of pole pieces 38 having air gaps 40 with a plane containing the air gaps being normal to the plane of the magnetic tape 30.

For purposes of illustration, the azimuth alignment of the face of the transducer head 14 may be stated as the angular relationship between the plane containing the air gaps 40 and a plane fully normal to the longitudinal axis of the tape 30. Optimum azimuth alignment of the transducer head 14 is attained when the plane containing the air gaps 40 is fully normal to the longitudinal axis of the tape 30 such that the above noted angular relationship is zero. As the upper planar portion 32 of the mounting bracket 10 lies in a plane normal to the plane of tape travel, it will be understood that when optimum azimuth alignment is attained the aforedescribed plane containing the air gaps 40 will be normal to the plane of the upper portion 32 of the mounting bracket.

The alignment of the transducer head 14 and its pole pieces 38 relative to the path of tape travel is very important to insure quality reproduction of intelligence recorded on the magnetic tape. The plane of the face of the transducer pole pieces 38 should be in engagement with, and be disposed in parallel relation to, the plane of the magnetic tape during translation thereof past the transducer head. Of equally great importance is the above described azimuth alignment of the face of the transducer head during reproduction or playback. For quality reproduction, the transducer head must be nearly perfectly aligned with the tape so that the air gaps 40 of the pole pieces 38 are nearly perfectly aligned with the recording tracks placed on the tape by the recording head. A misalignment between the transducer head pole pieces and the recorded tape tracks will considerably reduce the signal level on reproduction.

In the description and in the claims, the pole pieces are said to provide a "face" which defines a plane and this plane is said to be parallel to the plane of the passing tape. It will be appreciated that, when played, the tape may not lie in a single plane since it may be directed by guides over the V-shaped front 36 of the head 14, yet at the area of contact with the pole pieces I shall refer to there being a face defined by the pole pieces—parallel to the plane of the tape—and with the tape having a plane parallel to that face, although the areas of parallelism may be quite small. If the pole pieces of a tape recorder actually do not define a plane because they present a rounded surface then the plane tangent to the vortex of the rounded pole pieces will be considered the equivalent of the plane of a "face" provided by the pole pieces.

A plate member 42 is suitably secured to an upper surface 43 of the transducer head 14 such that the plate member 42 lies in a plane normal to the aforedescribed plane containing the air gaps 40 between the pole pieces 38 of the transducer head. The plate member 42 includes means thereon for adjustably mounting the transducer head 14 to the upper planar portion 32 of the support bracket 10. Such means comprises a pair of threaded support studs 44 and 46 which are fixedly secured to the plate member 42 in normal relation thereto so as to extend upwardly therefrom. The central axis of the first support stud 44 lies in the aforedescribed plane containing the air gaps 40 of the pole pieces 38 in the transducer head 14 and extends upwardly from the center of the transducer head. The second support stud 46 is offset relative to the first support stud 44 such that the axes of the support studs lie in a plane normal to both the plane containing the air gaps 40 and the plane of the plate member 42. Also the axes of the studs lie in a plane parallel to the plane of the tape.

The support studs 44 and 46 are received through corresponding apertures 48 and 50, respectively, in the upper planar portion 32 of the mounting bracket 10. The diameter of the aperture 48 is preferably made just slightly larger than the diameter of the first support stud 44, while the aperture 50 is elongated in planar configuration with its major axis being larger than the diameter of the second support stud 46 so as to allow angular movement of the transducer head 14 and the plate 42 secured thereto during azimuth alignment of the transducer head as will be more fully described below. The minor axis of aperture 50 is made just slightly larger than the diameter of stud 46 so as to maintain the axes of the studs in the aforedescribed plane parallel to the plane of the tape 30. A nut 52 is threadedly disposed on the outer end of each of the support studs 44 and 46 and provides means for adjusting the respective support studs 44 and 46 relative to the upper planar portion 32 of the mounting bracket 10.

Figure 4:
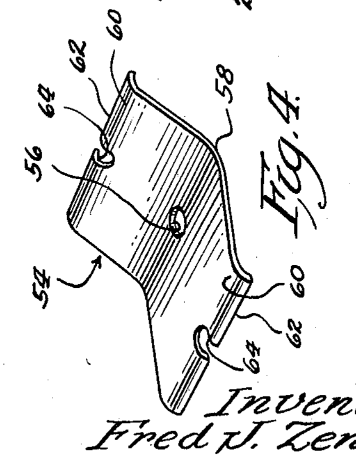
FIGURE 4 is a perspective view of the leaf spring illustrated in assembled relation in FIGURE 1.

As above noted, it is imortant that the plane of the face of the pole pieces 38 of transducer head face 14 be maintained parallel to the plane of travel of the tape 30 past the transducer head at all times during recording and reproducing. Means are provided between the upper surface of the plate member 42 and the undersurface **32*a* of the planar portion 32 of the mounting bracket 10 for insuring and maintaining such relationship while also serving to urge the transducer head downwardly from the planar portion 32 of the mounting bracket to thereby urge the nuts 52 against the upper surface of portion 32 of the bracket. Such means includes a leaf spring, indicated generally at reference numeral 54, having a central aperture 56 therein which receives the first support stud 44 therethrough. Referring to FIGURE 4, taken in conjunction with FIGURES 1 and 2, the leaf spring 54 is preferably formed from a flat metallic sheet or plate and has a curved cross section when viewing FIGURE 1. The lowermost surface has an engagement portion 58 at the mid-point of the spring and the uppermost surface has engagement portions 60 at opposite ends of the spring 54, which respective engagement portions engage the upper surface of the plate 42 and the undersurface 32*a* of the planar portion 32 of the mounting bracket 10, respectively, in line contact, with the lines of contact being parallel to each other and also parallel to the under surface 32*a* of the mounting bracket 10**, and normal to the plane of the tape.

The end margins 62 of the curved leaf spring 54 are each provided with a recess 64 such that the centers of the recesses 64 lie in a plane which preferably includes the center of the aperture 56 and is normal to the engaging portions 58, 60. The recesses 64 serve to receive depending projections 65 formed on the under surface of upper planar portion 32 of the mounting bracket 10 when in assembled position such that the recesses 64 cooperate with the projections 65 to prevent rotational movement of the leaf spring 54 about the support stud 44. It will be understood that the recesses 64 must be elongated to allow compression of the leaf spring during adjustment of the nut 52 on the stud 44. Another means of preventing rotation of leaf spring 54 is to form flanges from the upper planar portion 32 of bracket 10 which would lie parallel to the plane of the tape and closely adjacent one or both of the curved ends of the spring. Noting FIGURE 2, the leaf spring 54 has a width only slightly less than the width of the planar portion 32 of the mounting bracket 10 so as to provide substantial line contact between the leaf spring and the plate member 42 and planar portion 32 of the mounting bracket.

By dimensionally controlling the configuration of the leaf spring 54 such that the lower engaging portion 58 and the upper engaging portions 60 are in parallel relation, it can be seen that, as the nut 52 on the support stud 44 is rotated on the stud, the face of the transducer head 14 will be maintained in a plane perpendicular to the plane of the upper planar portion 32 of the mounting bracket 10. Because of the relationship of bracket 10 to the longitudinal path of the tape 30 this results in the face of the transducer head being retained parallel to the longitudinal path of the tape. Rotation of the nut 52 upon the support stud 44 serves to adjust the transducer head upwardly and downwardly with respect to the upper portion 32 of the mounting bracket and the magnetic tape 30, with the spring 54 being, respectively, more compressed or less compressed.

A helical coil spring 66 is disposed about the second support stud 46 between the upper surface of the plate member 42 and the undersurface of the planar portion 32 of the mounting bracket 10 and serves to urge the nut 52 on the support stud 46 against the upper surface of the mounting bracket portion 32. The spring rate of the helical coil spring 66 is made less than the spring rate of the leaf spring 54 so that rotation of the nut 52 on the support stud 46 will adjust the azimuth alignment of the transducer head 14, but will not substantially affect the relative upward or downward position of the transducer head as determined by the nut 52 on the support stud 44 and by the leaf spring 54. As noted hereinabove, the major axis of the elongated aperture 50 which receives the support stud 46 therethrough is made larger than the diameter of the support stud 46 so as to allow pivotal movement of the plate 42 about the line of contact with engaging portion 58 of the leaf spring 54 when rotating the nut 52 on the second, or offset, support stud 46.

OPERATION

Having thus described the elements comprising a preferred embodiment of an adjustable mounting arrangement in accordance with the present invention, its operation will now be briefly described. As noted above, the mounting bracket 10 is suitably secured to the base member 12 of a conventional magnetic tape recorder or other similar apparatus utilizing a continuous tape-like means upon which intelligence may be recorded and reproduced therefrom, such as the magnetic tape 30. The magnetic tape and its associated supply and take-up reels are supported relative to the base member 12 such that the plane of tape travel is perpendicular to the plane of the base 12. Since the upper planar portion 32 of the mounting bracket 10 is parallel to the base member 12, the plane of tape travel will accordingly be perpendicular to the plane of the upper planar portion 32 of the mounting bracket. After the mounting bracket 10 has been secured to the base member 12 and the tape 30 positioned in proper relation to the transducer head 14, the transducer head 14 is adjusted through rotation of the nut 52 on the first support stud 44 to obtain the desired relationship between the pole pieces 38 and the width of the tape 30. After having obtained that desired relation, the nut 52 on the second support stud 46 is rotated to obtain the desired azimuth alignment of the pole pieces relative to the tape 30. As previously noted, the optimum azimuth alignment is obtained when the plane of the air gap 40 between the pole pieces 38 is perpendicular to the longitudinal axis of the tape 30.

Since the engaging portions 58 and 60 of leaf spring 54 provide parallel lines of contact with the planar portion 32 of bracket 10 and with the head 14 and said lines extend normal to the plane of the tape 30, it can be seen that the leaf spring 54 will maintain the plane of the face of the pole pieces of the transducer head 14 normal to the plane of the upper planar portion 32 of the mounting bracket and parallel to the plane of tape travel. By so maintaining said face of the transducer head 14 in a plane parallel to the tape and normal to the planar portion 32 of the mounting bracket, and by providing the axes of the support studs 44 and 46 in a plane parallel to the plane of the tape travel and perpendicular to the planar portion 32 of the mounting bracket, it is merely necessary to rotate the nut 52 on the offset support stud 46 to vary the azimuth alignment of the pole pieces 38 and the air gap 40 relative to the longitudinal axis of the tape 30. Because of the improved and simplified mounting arrangement of my invention, no skewing of the head or pole pieces will result either during such azimuth adjustment or during raising or lowering of the head relative to the tape.

While the base member 12 is shown as horizontal, and while various structural elements are referred to as being up or down relative to it or to each other, such expressions as "up" and "down," "vertical" and "horizontal," "above" and "below," etc., are not intended in a limiting sense but are used to indicate the relative positions or relative movements of components of the preferred form of my invention which is illustrated.

Further, while the subject invention has been described in conjunction with a transducer head for use with magnetic tapes, it will be obvious to those skilled in the art that the mounting arrangement of the subject invention readily lends itself to use with any article to be supported and for which it is desired that upward and downward movement and azimuth alignment of the article be facilitated.

I claim:

1. In adjustable mounting means for supporting a transducer head structure or the like relative to a flexible tape supported from a base for translation past the head structure and in contact therewith said transducer head structure including at least one set of pole pieces defining a tape engagement plane and having an air gap with the median plane of the air gap being normal to the tape engagement plane, the improvement comprising, in combination, a mounting bracket structure adapted to be secured to said base member, means consisting of only first and second studs rigidly secured to said transducer head structure by their one ends for connecting said head structure to said bracket structure, at least one of said studs being disposed in offset relation to said median plane of the air gap, adjustable means associated with the other ends of said studs and connecting said studs to said mounting bracket structure such that the tape engagement plane of said transducer head is disposed in contacting relation with the flexible tape during translation thereof, and resilient means disposed between said mounting bracket structure and said transducer head structure and engaging both structures to maintain said tape engagement plane of said transducer head structure parallel to and in engagement with the flexible tape, said resilient means comprising a single curved leaf spring engaging one of said structures in a single line contact lying in said median plane and engaging the other structure by contacts defining a plane parallel to said single line contact, so that adjustment of said first stud through its corresponding adjustable means effects movement of the tape engagement plane of said transducer head structure in a direction generally transverse to the tape with the tape engagement plane maintained in contact with and parallel to said flexible tape, while adjustment of the adjustable means for said second stud serves to vary the azimuth alignment of said transducer head structure relative to the tape.

2. The improvement of claim 1 wherein said leaf spring engages said mounting bracket structure in a manner defining two lines of contact disposed on opposite sides of the median plane of said air gap and defining a plane parallel to a single line contact defined by engagement of said leaf spring with said transducer head in said median plane of the air gap and wherein the axis of the first stud lies in said median plane.

3. The improvement of claim 2 wherein the lines of contact of the leaf spring are all parallel to each other, and said resilient means includes a second spring acting between said head and said mounting bracket structure and said second spring has a lesser spring rate than said leaf spring.

4. The improvement of claim 3 wherein the second spring is a coil spring disposed around said second stud.

5. The improvement of claim 2 wherein said leaf spring at said line contact with said transducer head is apertured to permit the passage of said first stud therethrough.

6. The improvement of claim 2 wherein the leaf spring includes means cooperating with said mounting bracket structure to prevent rotation of said leaf spring relative to said mounting bracket structure.

7. The improvement of claim 2 wherein the studs are parallel and have their axes lying in a plane parallel to the tape engaging plane of the transducer head structure.

8. The improvement of claim 2 wherein said transducer head structure includes a plate which is connected to said head structure with said studs being connected to said plate.

9. The improvement of claim 8 wherein the mounting bracket structure has a pair of spaced apertures through which said studs extend and said adjustable means on the studs retain the studs in said apertures.

10. The improvement of claim 5 wherein the leaf spring includes means cooperating with said mounting bracket structure to prevent rotation of said leaf spring relative to said mounting bracket, the mounting bracket structure has a pair of spaced apertures through which said first and second studs extend, said adjustable means on the studs retain the studs in said apertures, and said studs are parallel and their axes lie in a plane parallel to the tape engagement plane of the transducer head.

11. The improvement of claim 10 wherein said resilient means includes a coil spring surrounding the second stud and acting between said head and said mounting bracket structure and having a lesser spring rate than said leaf spring.

References Cited

UNITED STATES PATENTS

| | | | |
|---|---|---|---|
| 2,560,569 | 7/1951 | Hare | 179—100.2 |
| 2,587,097 | 2/1952 | Berlant | 179—100.2 |
| 2,678,971 | 5/1954 | Barany | 179—100.2 |
| 2,742,536 | 4/1956 | Uritis | 179—100.2 |
| 2,897,288 | 7/1959 | Wijchman | 179—100.2 |
| 2,997,547 | 8/1961 | Beachell | 179—100.2 |
| 3,137,772 | 6/1964 | Guest | 179—100.2 |
| 3,155,359 | 11/1964 | Hogan et al. | 179—100.2 |
| 3,190,970 | 6/1965 | Atsumi | 179—100.2 |
| 3,229,044 | 7/1966 | Kokke | 179—100.2 |
| 3,310,791 | 3/1967 | Fischer | 179—100.2 |

FOREIGN PATENTS

| | | |
|---|---|---|
| 1,020,801 | 12/1957 | Germany. |
| 1,042,255 | 10/1958 | Germany. |
| 1,011,159 | 6/1957 | Germany. |
| 970,166 | 9/1964 | Great Britain. |
| 828,014 | 12/1951 | Germany. |

BERNARD KONICK, Primary Examiner

JEROME P. MULLINS, Assistant Examiner